US012762242B2

(12) United States Patent
De Santis et al.

(10) Patent No.: US 12,762,242 B2
(45) Date of Patent: Oct. 13, 2026

(54) BOOTING DEVICE FOR A COMPUTER ELEMENT AND METHOD FOR BOOTING A COMPUTER ELEMENT

(71) Applicant: SIEMENS AKTIENGESELLSCHAFT, Munich (DE)

(72) Inventors: Fabrizio De Santis, Munich (DE); Markus Dichtl, Neu-Ulm (DE); Daniel Schneider, Munich (DE); Tolga Sel, Munich (DE); Thomas Zeschg, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/012,650

(22) PCT Filed: Jun. 17, 2021

(86) PCT No.: PCT/EP2021/066442
§ 371 (c)(1),
(2) Date: Dec. 22, 2022

(87) PCT Pub. No.: WO2021/259759
PCT Pub. Date: Dec. 30, 2021

(65) Prior Publication Data

US 2023/0252154 A1 Aug. 10, 2023

(30) Foreign Application Priority Data

Jun. 23, 2020 (EP) .................................... 20181627

(51) Int. Cl.
*G06F 21/57* (2013.01)
*G06F 9/4401* (2018.01)
*H04L 9/32* (2006.01)

(52) U.S. Cl.
CPC .......... *G06F 21/575* (2013.01); *G06F 9/4401* (2013.01); *H04L 9/3242* (2013.01); *G06F 2221/034* (2013.01)

(58) Field of Classification Search
CPC ................ G06F 21/575; G06F 9/4401; G06F 2221/034; H04L 9/3242
See application file for complete search history.

(56) References Cited

U.S. PATENT DOCUMENTS 7,071,533 B1 * 7/2006 Kimber ............... H10D 84/401 257/E29.174
8,560,823 B1 10/2013 Zhang et al.
(Continued)

FOREIGN PATENT DOCUMENTS

CN 1553315 A 12/2004
CN 101199159 A 6/2008
(Continued)

OTHER PUBLICATIONS

PCT International Search Report and Written Opinion of International Searching Authority mailed Apr. 23, 2022 for International App PCT/EP2021/066442.

*Primary Examiner* — Faisal M Zaman
(74) *Attorney, Agent, or Firm* — Lempia Summerfield Katz LLC

(57) ABSTRACT

The invention relates to a booting device (2) for a computer element (1) for booting the computer element (1), wherein the booting device (2) comprises a memory unit (3) for storing a protection code (4), and a protection unit (5) for checking the integrity of a software component (6) of the computer element (1) based on the protection code (4), wherein the booting device (2) is suitable for executing the software component (6) to boot the computer element (1), wherein the protection code (4) can be at least partially changed from outside the booting device (2). The protection
(Continued)

code, which serves to check the integrity of a booting process, can be changed and/or updated from outside the booting device, e.g. by a user.

15 Claims, 5 Drawing Sheets

(56) References Cited

U.S. PATENT DOCUMENTS

| | | | | |
|---|---|---|---|---|
| 9,230,112 | B1 * | 1/2016 | Peterson | G06F 21/76 |
| 11,520,891 | B1 * | 12/2022 | Karolitsky | H04L 9/3247 |
| 2004/0039872 | A1 * | 2/2004 | Takamizawa | G06F 8/65 713/2 |
| 2005/0138409 | A1 * | 6/2005 | Sheriff | G06F 21/575 726/26 |
| 2005/0144443 | A1 * | 6/2005 | Cromer | G06F 21/78 713/165 |
| 2006/0236122 | A1 | 10/2006 | Field et al. | |
| 2007/0067617 | A1 | 3/2007 | Tarkkala | |
| 2007/0118880 | A1 * | 5/2007 | Mauro, II | G06F 21/79 726/4 |
| 2007/0162964 | A1 * | 7/2007 | Wang | G06F 21/77 726/5 |
| 2007/0192610 | A1 | 8/2007 | Chun et al. | |
| 2007/0300053 | A1 * | 12/2007 | Dale | G06F 9/4405 713/2 |
| 2008/0061817 | A1 * | 3/2008 | Erickson | G06F 30/34 326/8 |
| 2008/0082828 | A1 | 4/2008 | Jennings et al. | |
| 2009/0024784 | A1 * | 1/2009 | Wang | G06F 21/572 711/E12.001 |
| 2009/0144559 | A1 * | 6/2009 | Lee | G06F 21/575 713/189 |
| 2013/0145080 | A1 * | 6/2013 | Grandin | G06F 12/0246 711/103 |
| 2014/0369137 | A1 * | 12/2014 | Lee | G11C 17/16 365/189.2 |
| 2015/0067313 | A1 * | 3/2015 | Zaidi | G06F 21/572 713/2 |
| 2015/0100792 | A1 * | 4/2015 | Hartley | H04N 21/4432 713/189 |
| 2015/0236856 | A1 * | 8/2015 | Moore | H04L 9/3247 713/176 |
| 2015/0242158 | A1 * | 8/2015 | Hung | G06F 3/0659 711/103 |
| 2015/0293857 | A1 * | 10/2015 | Cope | H04L 9/0894 713/193 |
| 2016/0321472 | A1 * | 11/2016 | Pedersen | G06F 21/74 |
| 2017/0142083 | A1 * | 5/2017 | Kumar | G06F 12/1408 |
| 2017/0359171 | A1 * | 12/2017 | Haridas | G06F 21/57 |
| 2018/0004953 | A1 * | 1/2018 | Smith, II | H04L 9/3268 |
| 2018/0091313 | A1 * | 3/2018 | Li | G06F 9/4403 |
| 2018/0183590 | A1 * | 6/2018 | Kuo | H04L 9/0838 |
| 2019/0005245 | A1 * | 1/2019 | Laffey | G06F 3/0632 |
| 2019/0050573 | A1 * | 2/2019 | Connor | G06F 21/572 |
| 2019/0065751 | A1 * | 2/2019 | Srinivas | G06F 21/575 |
| 2019/0108347 | A1 * | 4/2019 | Ghetie | G06F 9/4418 |
| 2019/0294826 | A1 * | 9/2019 | Obara | H04L 9/0819 |
| 2019/0311126 | A1 * | 10/2019 | Areno | H04L 9/0866 |
| 2019/0325137 | A1 * | 10/2019 | Itkin | H04L 9/30 |
| 2020/0097658 | A1 * | 3/2020 | Samuel | G06F 11/0793 |
| 2020/0210085 | A1 * | 7/2020 | Chung | G06F 3/0632 |
| 2020/0226264 | A1 * | 7/2020 | Xu | G06F 9/4401 |
| 2020/0342112 | A1 * | 10/2020 | Plusquellic | G06F 21/602 |
| 2020/0379831 | A1 * | 12/2020 | Shimbo | G06F 11/0763 |

FOREIGN PATENT DOCUMENTS

| | | | |
|---|---|---|---|
| CN | 108021812 | A | 5/2018 |
| CN | 110187920 | A | 8/2019 |
| RU | 2008132185 | A | 2/2010 |

* cited by examiner

BOOTING DEVICE FOR A COMPUTER ELEMENT AND METHOD FOR BOOTING A COMPUTER ELEMENT

This application is the National Stage of International Application No. PCT/EP2021/066442, filed Jun. 17, 2021, which claims the benefit of European Patent Application No. EP 20181627.9, filed Jun. 23, 2020. The entire contents of these documents are hereby incorporated herein by reference.

BACKGROUND

The present embodiments relate to a booting device for a computer element, for booting the computer element, a computer element having a booting device, and to a method for booting a computer element.

In order to protect the integrity of a computer element, it may be important that the booting process (e.g., the "start-up process") of the computer element is securely configured such that, upon the booting thereof, the anticipated functionality is executed. Thus, for example, in the context of a "secure boot", a check is executed as to whether the next respective software element to be loaded is an integer. To this end, a digital signature, a hash value, or similar of the loaded software is determined and checked before the software is run. The protection method employed for checking the loaded software, together with the digital signature employed, the hash value employed, or similar, may form non-editable program code of the booting device, which is determined by the manufacturer of the booting device.

SUMMARY AND DESCRIPTION

The scope of the present invention is defined solely by the appended claims and is not affected to any degree by the statements within this summary.

The present embodiments may obviate one or more of the drawbacks or limitations in the related art. For example, improved booting of a computer element is provided.

According to a first aspect, a booting device for a computer element, for booting the computer element, is provided. The booting device includes a memory unit for storing a protection code, and a protection unit for checking the integrity of a software component of the computer element by reference to the protection code. The booting device is appropriate (e.g., configured) for executing the software component to boot the computer element. The protection code may be at least partially changed from outside the booting device.

As the protection code may be at least partially changed from outside the booting device, a user of the booting device (e.g., an end user of the booting device or a machine manufacturer who integrates the computer element into their machine) particularly has the option of preferring a specific cryptographic protection method. The user of the booting device may implement a dedicated protection solution, without the necessity of departing from the solution implemented by the manufacturer of the booting device. By the alteration of the protection code, a dedicated implementation for the authentication, integrity checking, and/or confidentiality protection of the booting device may be defined.

Further, the protection code may be updated and, for example, may be varied such that a new (e.g., altered) protection code also provides protection against new technologies such as, for example, quantum computer technologies. Cryptographic agility is permitted as a result, and protection provided by the protection code may be enhanced.

The booting device may be part of the computer element. The booting device may also be described as a processing device, a computing apparatus, or a processing apparatus. The booting device is particularly appropriate for booting the computer element. The booting device may be a processor chip (e.g., a sealed processor chip). The booting device is, for example, a component that is not accessible in a non-destructive manner and that, for example, may only be accessed non-destructively via permitted interfaces.

The term "booting" describes, for example, a start-up process (e.g., a run-up of the computer element). For example, during booting, the operating system of the computer element is loaded. In the context of booting, at least one software component (e.g., start-up program component) is loaded and executed in order to start-up/boot the computer element. The software component is a software. The software component is, for example, a boot loader.

The computer element may be a computer or an element thereof. Further, the term computer element may include a device having a plurality of components, that are loaded in conjunction with the run-up of the computer element. These include, for example, I/O modules (input/output modules), CPU modules (Central Processing Unit modules, also described as processor modules) and FPGAs (Field Programmable Gate Arrays, also described as programmable logic gates). The computer element is employed, for example, in an industrial environment (e.g., in an industrial automation system). The option for the alteration of the protection code is important, for example, in an industrial environment, as this environment dictates particularly stringent security requirements, and on the grounds that, in many cases, industrial devices are in service over a period of many years, and the protection mechanisms thereof, in the absence of updating, undergo ageing and a consequent reduction of protection.

The protection code may be considered as an execution command, a program code, and/or an executable command for the implementation of a protection function. The protection code may be executed by the memory unit in order to check the integrity of the software component. The software component is an integer in the event that, further to the production thereof, the software component has not undergone any alteration, or at least has not been altered in an inadmissible manner.

The protection code is, for example, alterable by a user (e.g., end user or machine manufacturer), or by an external device from outside the booting device. The term alterable may, for example, signify that an existing protection code may be at least partially modified, rewritten in an expanded form, and/or deleted. The term alterable may also signify that the protection code may be defined from outside the booting device. It is possible, for example, for a protection code that has been defined by a manufacturer of the booting device to be altered in the field, or for an initial protection code to be defined in the field in the first instance (e.g., in the event that no protection code has been defined by the manufacturer of the booting device).

Alteration of the protection code is, for example, a variation of the protection code that is permitted by the manufacturer of the booting device and is initiated and/or required by the user of the booting device.

The respective unit (e.g., the memory unit or the protection unit) may be implemented in the form of a hardware and/or in the form of a software.

According to one embodiment, the memory unit includes at least one eFuse, where the protection code is programable on a one-time basis by the burn-in of a protection value in the eFuse.

The protection code is altered by the burn-in of a protection value in the eFuse. The term eFuse (or "electronic fuse") describes an irreversible and non-bypassable element of the booting device that is variable (e.g., definable) on a one-time basis only. In order to define the protection code using the eFuse, bits may be burned into the eFuse. For example, the manufacturer of the booting device will provide at least one "blank" and undefined eFuse in the booting device, the burn-in (e.g., configuration) of which may be executed by the user.

According to a further embodiment, the protection value includes a comparative hash value and/or a cryptographic key, where the protection unit is appropriate, in conjunction with the integrity check of the software component: for a comparison of a component hash value of the software component with the comparative hash value, and/or for the decryption, and/or checking of cryptographically protected information assigned to the software component, by reference to the cryptographic key.

The protection value, for example, is a trustworthy element of information that is employed for the integrity checking of the software component by the protection unit.

The component hash value is, for example, a hash value of the software component that is assigned to the software component or is determined by the protection unit. The comparative hash value may be a hash value that is an element of the protection code and is employed for comparison with the component hash value. If the component hash value is identical to the comparative hash value, the protection unit determines, for example, that the software component is an integer.

The cryptographic key may be a secret symmetric key, a public key, or similar. The term cryptographic key may also be understood as a cryptographic test value that may be a Message Authentication Code (MAC), a digital code, or similar.

According to a further embodiment, the protection code includes an editable cryptographic code (e.g., an editable hash code). The protection unit is capable, in conjunction with the integrity check of the software component, of running the editable hash code in order to execute a hash value comparison, and/or of running the editable cryptographic code in order to execute a cryptographic encryption, decryption, and/or check.

The cryptographic code (e.g., the hash code) is, for example, a software program code that forms part of the protection code and is configured for integrity checking. The cryptographic code defines, for example, the cryptographic algorithm according to which cryptographically protected information that is assigned to the software component is to be managed and/or checked with respect to the integrity of the software component.

The hash code defines, for example, how a hash value check of the software component is to be executed. In hash value checking, for example, a hash value of the software component (e.g., software component hash value) is determined in accordance with the hash code, and is compared with a comparative hash value.

According to a further embodiment, the booting device is configured only to permit an alteration of the protection code from outside the booting device in the event that: the booting device detects that the alteration of the protection code is executed via an interface of the protection unit that is provided by the manufacturer of the booting device for this purpose; and/or the booting device detects that the alteration of the protection code is executed in accordance with a predefined standard and/or by reference to a predefined amendment file that is stipulated by the manufacturer of the booting device; and/or the booting device detects that the alteration of the protection code is executed using a predefined configuration device of the manufacturer; and/or the booting device only permits a one-time alteration of a respective region of the protection code, and the booting device detects that the alteration is the first alteration of the protection code in the respective region thereof.

For example, the booting device will only permit alteration in one of the above-mentioned cases. If the booting device detects an attempted alteration that is not executed in accordance with a permitted alteration process, the booting device may prohibit the alteration and/or may generate a warning signal via an advance warning of an unacceptable alteration (or a potential attack). By these measures, the security of the booting device may be enhanced, as only approved users are permitted to execute alterations of the protection code.

The manufacturer of the booting device may stipulate, for example, that alterations to the protection code may only be executed via an interface on the protection unit that is provided by the manufacturer of the booting device for this purpose (e.g., via the JTAG (Joint Test Action Group), where the interface may be deactivated during the operation of the booting device, such as by an eFuse), only in accordance with a predefined standard, by reference to a predefined amendment file that is supplied by the manufacturer (e.g., via the JTAG) and/or on a one-time basis (e.g., the memory unit may include an OTP, or one-time programmable areas). It is also possible that the programing of the memory unit and the alteration of the protection code will only be permissible if the computer element is in a configuration mode and the eFuse has yet to be burned-in.

For detection as to whether an alteration has been executed in accordance with the above-mentioned conditions, a conditional alteration code may be saved in the form of program code in the memory unit that is run in order to check the admissibility of the alteration. The conditional alteration code is not editable and, for example, is defined by the manufacturer of the booting device. In one embodiment, the memory unit itself has properties that only permit specific alterations of the protection code.

According to a further embodiment, the booting device is configured in the form of a computer chip.

The computer chip is particularly a processor chip (CPU).

According to a further embodiment, the computer element includes a computer, an I/O module, a CPU module, or a FPGA system that, upon booting, is configurable in the form of a software component by reference to a bitstream.

According to a further embodiment, the software component includes hardware and/or software and, for example, is a first bootloader stage.

According to a further embodiment, the booting device further includes a booting unit for executing the software component in the event that the protection unit determines, by an integrity check, that the software component fulfils all requirements for integrity.

According to a further embodiment, the protection unit is appropriate (e.g., configured) for the integrity checking of the software component, as follows: hashing of a signature verification code with a hash code of the booting device, in order to obtain a first hash result; and comparison of the first hash result with a signature verification code hash value of the memory unit. In the event that the comparison of the first hash result with the signature verification code hash value confirms that the first hash result and the signature verification code hash value are identical, the protection unit is further configured for the integrity checking of the software component as follows: acquisition of the software component, including a signature of the software component and a public key for the software component from the software component; hashing of the public key of the software component with the hash code of the booting device, in order to obtain a second hash result; comparison of the second hash result with a public key hash value of the memory unit; in the event that the comparison of the second hash result with the public key hash value confirms that the second hash result and the public key hash value are identical, checking of the signature of the software component by reference to the signature verification code; and in the event that the check of the signature of the software component confirms that the signature is correct, execution of the software component.

According to a further embodiment, the computer element is a FPGA system, and the protection unit is appropriate (e.g., configured) for the integrity checking and/or decryption of the software component, as follows: hashing of an authenticated decryption code with a hash code of the booting device, in order to obtain a third hash result; and comparison of the third hash result with an authenticated decryption code hash value of the memory unit. In the event that the comparison of the third hash result with the authenticated decryption code hash value confirms that the third hash result and the authenticated decryption code hash value are identical, the protection unit is further configured for the integrity checking and/or decryption of the software component, as follows: acquisition of the software component, which is configured in the form of a FPGA bitstream, including an authentication tag for the software component, by the booting device; decryption of the FPGA bitstream by reference to the authenticated decryption code (and, for example, by reference to a secret symmetric key); checking of the authentication tag of the software component; and in the event that the check of the authentication tag is successful, configuration of a FPGA of the FPGA system using the decrypted bitstream.

According to a second aspect, a computer element having a booting device according to the first aspect, or according to an embodiment of the first aspect, is provided.

The embodiments and features described for the booting device of the present embodiments apply correspondingly to the computer element of the present embodiments.

According to a third aspect, a method is provided for booting a computer element having a booting device (e.g., having a booting device according to the first aspect or according to an embodiment of the first aspect). The method includes saving a protection code, executing an integrity check on a software component of the computer element that is run upon the booting of the computer element, by reference to the protection code, and at least partially altering the protection code from outside the booting device.

The embodiments and features described for the booting device of the present embodiments apply correspondingly to the method of the present embodiments.

According to a fourth aspect, a computer program product is provided.\, The computer program product includes commands that, upon the running of the program by a booting device (e.g., by a booting device according to the first aspect or according to an embodiment of the first aspect), initiate the execution by the botting device of the method according to the third aspect.

A computer program product, such as, for example, computer program means may be provided or delivered in the form of a storage medium, such as, for example, a memory card, a USB stick, CD-ROM or DVD, or in the form of a downloadable file from a network server. This may be achieved, for example, in a wireless communication network by the transmission of a corresponding file that contains the computer program product or computer program means.

Further potential implementations of the invention also include combinations that are not explicitly specified, of features or embodiments described heretofore or described hereinafter with reference to the exemplary embodiments. A person skilled in the art will also add individual aspects via improvements or additions to the respective basic form of the invention.

DETAILED DESCRIPTION

In the figures, identical or functionally equivalent elements are identified by same reference symbols, unless indicated otherwise.

Figure 1:
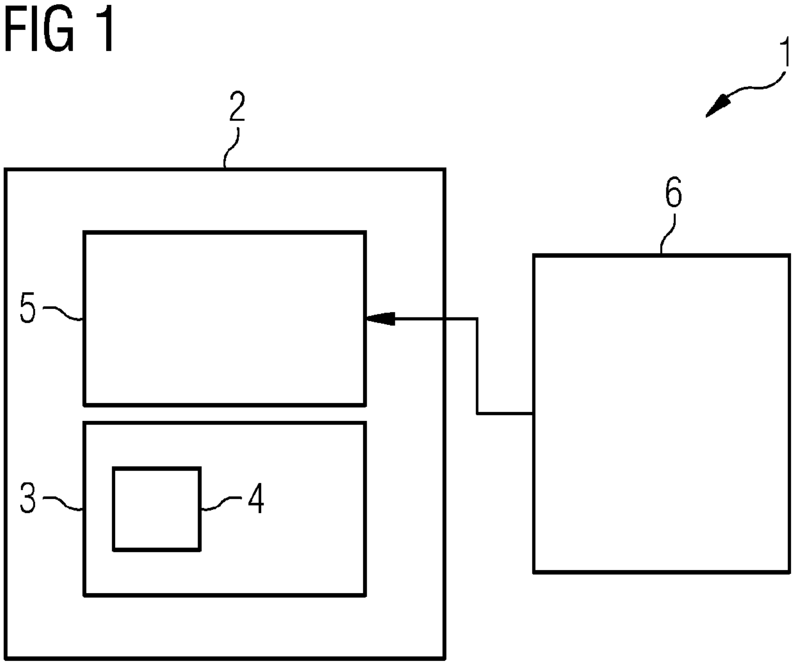
FIG. 1 shows a computer element having a booting device according to a first embodiment.

FIG. 1 shows a computer element 1 having a booting device 2 according to a first embodiment. The computer element 1 includes, in addition to the booting device 2, a software component 6. The computer element includes a memory unit 3 for saving a protection code 4, and a protection unit 5. The arrow in FIG. 1 indicates that the protection unit 5 has access to the software component 6.

The computer element 1 according to FIG. 1 is an industrial automation system. The booting device 2 is configured in the form of a processor (CPU), and the function thereof, inter alia, is the run-up (e.g., booting) of the computer element 1.

Properties of the individual elements of the computer element 1 according to FIG. 1 are described hereinafter with reference to FIG. 2, which represents a method for booting the computer element 1 according to FIG. 1, according to a first embodiment.

Process act S0 designates the start of the method described. In a subsequent act S1, the protection code 4 is saved in the memory unit 3. The protection code 4 is originally saved by a manufacturer of the processor 2. The protection code 4 is a program that, upon the booting of the computer element 1, is run for the checking of the integrity of the software component 6 by the protection unit 5. It is also possible for no initial protection code 4 to be saved by the manufacturer of the processor 2, where the manufacturer only makes storage space available in the memory unit 3, which may then be employed by the user of the processor 2 for the protection code 4.

In act S2, the protection code 4 is at least partially altered from outside the processor 2. To this end, a user of the processor 2 in the field accesses the memory unit 3 and alters the previously saved protection code 4, such that the previously saved protection code 4 corresponds to the desired requirements. The user may amend either cryptographic keys, hash values, or similar, which are employed in the integrity checking of the software component 6, or program elements that define the execution of the integrity check itself.

Figure 2:
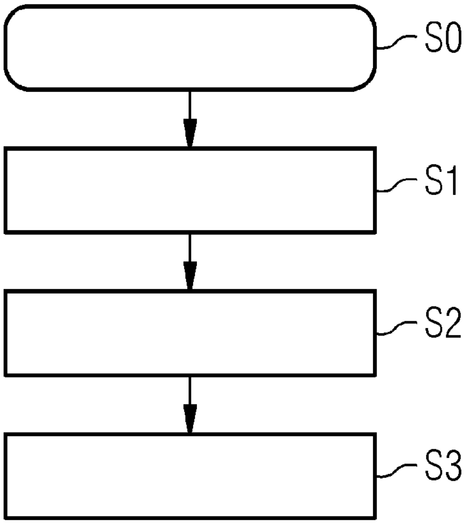
FIG. 2 shows a method for booting the computer element according to FIG. 1, according to a first embodiment.

For the alteration of the protection code in act S2 of FIG. 2, the user may employ a device that is provided by the manufacturer of the processor 2 for this purpose.

In act S3, the protection unit 3 executes an integrity check of the software component 6. To this end, the protection unit 3 runs the protection code 4, and applies the protection code 4 to information that constitutes an element of the software of the software component 6.

The processor 2 according to FIG. 1 permits a flexible variation of the protection code 4 by the user. As a result of this, the integrity check of the software component 6 is executed with a higher degree of security. The entire booting process is more securely configured as a result.

Figure 3:
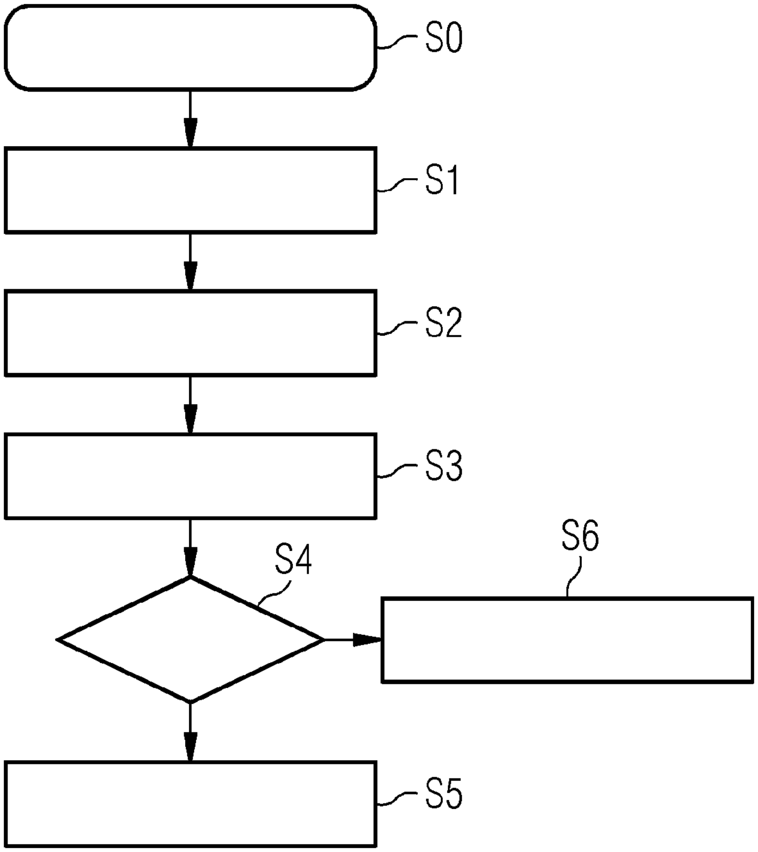
FIG. 3 shows a method for booting the computer element according to FIG. 1, according to a second embodiment.

FIG. 3 shows a method for booting the computer element 1 according to FIG. 1, according to a second embodiment. The method according to this figure, as per the method according to FIG. 2, includes the acts S0 to S3. The method according to FIG. 3 also includes acts S4, S5 and S6.

Depending upon whether or not the protection unit 5, in the integration check act S3, establishes that the software component 6 is an integer or otherwise (act S4), either act S5 or S6 is executed. In the event that, in acts S3 and S4, it is established that the software component 6 is an integer, the software component 6 is executed (act S5) by the protection unit 5 or by an additional booting unit (not represented in FIG. 1). In the event that, in acts S3 and S4, it is established that the software component 6 is not an integer, a corresponding warning signal is generated in act S6.

Detailed configurations of the computer element 1 and the booting device 2 are described in greater detail hereinafter with reference to FIGS. 4 to 8.

Figure 4:
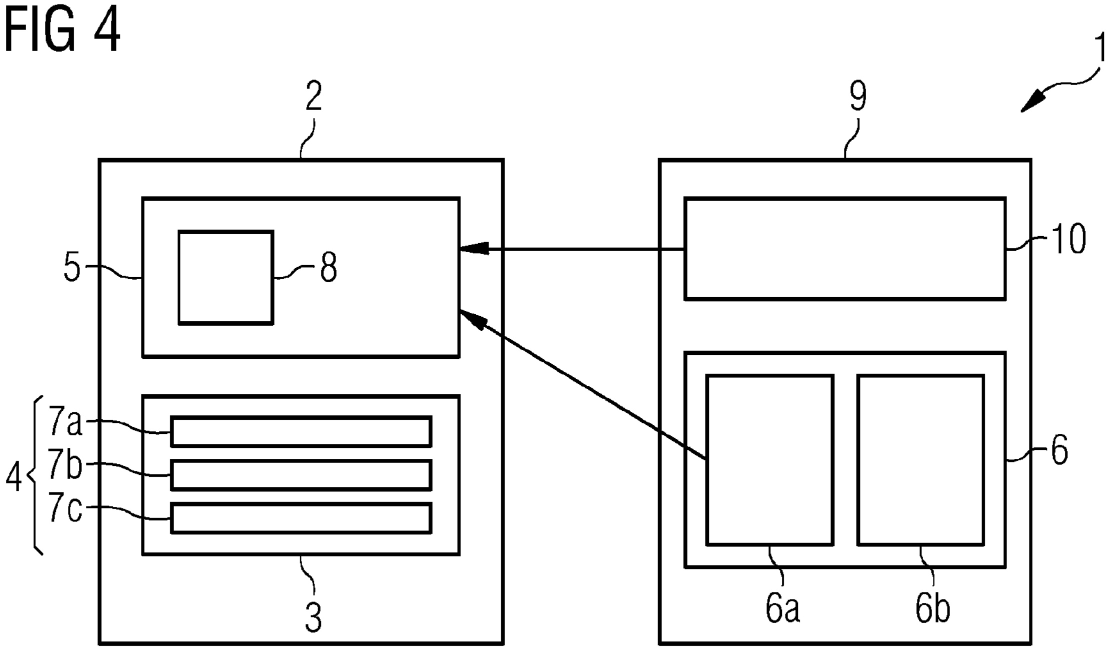
FIG. 4 shows a computer element having a booting device according to a second embodiment.

FIG. 4 shows a computer element 1 having a booting device 2, according to a second embodiment. Using the booting device 2 in the second embodiment (FIG. 4), a signal checked in the first booting step may be updated and optionally replaced by a quantum computer-resistant signature method. In the protection unit 5, which is configured in the form of a boot ROM, a hash code 8 is saved, which is a program by which the protection unit 5 executes a hash value check on the software component 6.

The software component 6, in the example according to FIG. 4, is saved in an internal memory 9 of the computer element 1. In the memory 9, a Signal Verification Code (SVC) 10 and the software component 6 that, in this case, is configured in the form of a first bootloader stage, are saved. The software component 6 includes an associated component signature 6*a* and an associate component key 6*b* that is a public key.

The memory unit 3 includes a plurality of eFuses 7*a*-7*c* that are supplied blank by the manufacturer of the processor 2 and may be programed by the user of the processor 2, and form at least an element of the protection code 4. In order to alter the protection code 4, the user executes the burn-in of protection values in the eFuses 7*a*-7*c*. This may be executed in a secure environment.

In the example according to FIG. 4, the user, for example, has executed the burn-in of a public key hash value in the eFuse 7*a* and a signature verification code hash value in the eFuse 7*b*. The eFuse 7*c* and further eFuses (e.g., unrepresented) include further public key hash values and signature verification code hash values. Obsolete hash values may be invalidated, either automatically or by the burn-out of an eFuse 7*a*-7*c* provided for this purpose.

In tandem with the updating of hash values, the signal verification code 10, the component signature 6*a*, and the component key 6*b* are also updated. Updating operations, which are permitted by the processor 2 according to the second embodiment (FIG. 4), are then of particular relevance in the event that the cryptographic algorithm (e.g., under an asymmetric signature method) of the signature verification code 10, but not the hash code 8, has failed or has weak points.

Figure 5:
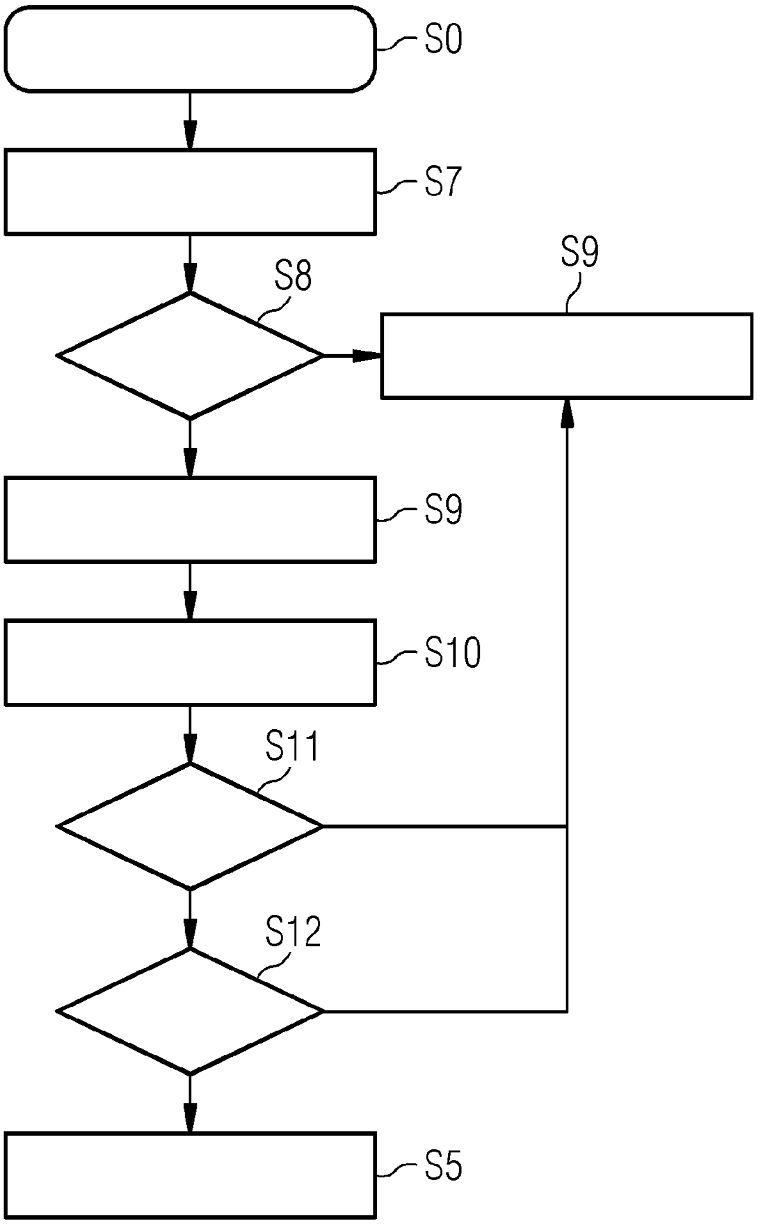
FIG. 5 shows a method for booting the computer element according to FIG. 4.

FIG. 5 shows a method for booting the computer element 1 according to FIG. 4. Here again, the method commences with act S0. In act S7, the protection unit 5 retrieves the signature verification code 10 from the memory 9 (represented in FIG. 4 by an arrow) and hashes the signature verification code 10 with the previously saved hash code 8. As a result of this, a first hash result (e.g., component hash value) is obtained.

In act S8, this first hash result is compared with the signature verification code hash value of the eFuse 7*b*. If it is confirmed by this comparison that the hash values are not identical, an error is notified in act S9, and the process is terminated. If it proceeds from the comparison in step S8 that the hash values are identical, the process continues to act S9.

In act S9, the protection unit 5 accesses the software component 6, with the component signature 6*a* and the component key 6*b*.

In act S10, the protection unit 5 hashes the public key 6*b*. As a result of this, a second hash result is obtained. In act S11, a check is executed as to whether the second hash result and the public key hash value in the eFuse 7*a* are identical. If the second hash result and the public key hash value in the eFuse 7*a* are not identical, an error is notified in act S9, and the process is terminated.

In act S12, in the event of identity, by reference to the signature verification code 10, a check is executed for the validity of the component signature 6*a*. In the event that, in act S12, it is established that the component signature 6*a* is not valid, an error is notified in act S9, and the process is terminated. In the event that, in act S12, it is established that the component signature 6*a* is valid, the software component is executed in act S5.

Figure 6:
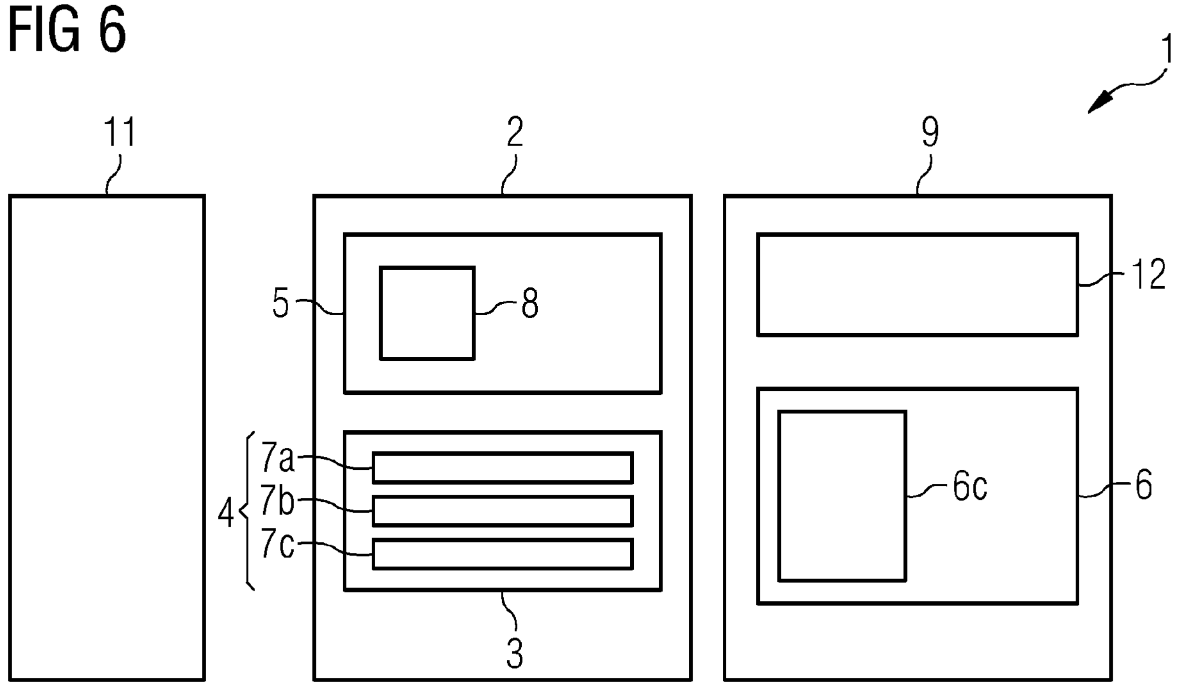
FIG. 6 shows a computer element having a booting device according to a third embodiment.

FIG. 6 shows a computer element 1 having a booting device 2, according to a third embodiment, and relates to the know-how protection of FPGA bitstreams. Customarily, symmetric cryptographic encryption methods that are permanently integrated in hardware by hardware manufacturers are employed for this purpose. The processor 2 according to FIG. 6, however, permits the employment of a method implemented by the user for authenticated decryption. To this end, a burn-in of a secret key in an eFuse is executed by the user. This is described in greater detail hereinafter. In this case, the computer element 1 is a FPGA system having a FPGA 11, a processor 2, and a memory 9.

In the memory 9, a FPGA bitstream 6 is saved as a software component that includes an authentication tag 6*c* and an authenticated decryption code 12. The FPGA bitstream 6 is encrypted and, upon the start-up of the computer element 1, is decrypted by the booting device 2 and employed for the configuration of the FPGA 11.

The processor 2 according to FIG. 6 is configured identically to the processor 2 according to FIG. 4, although the protection values saved in the eFuses 7*a*-7*b* are different. In the example according to FIG. 6, a secret symmetric key is saved in the eFuse 7*a*, and an authenticated decryption code hash value is saved in the eFuse 7*b*. The eFuse 7*c* and further eFuses (e.g., unrepresented) include further secret symmetric keys and authenticated decryption code hash values. Protection values contained in the eFuses 7*a*-7*c* may be established in the field, from outside the processor 2. Obsolete hash values and keys may be invalidated, either automatically or by the burn-out of an eFuse 7*a*-7*c* provided for this purpose.

By way of distinction from the booting device according to the second embodiment (FIG. 4), in the case of symmetric cryptography, the secret symmetric key is to be entirely saved in the eFuses 7*a*-7*c* (e.g., not externally readable). Consequently, for the secret symmetric key, a variable length may be possible, as the key length is dependent upon the method selected and the preferred security level.

Figure 7:
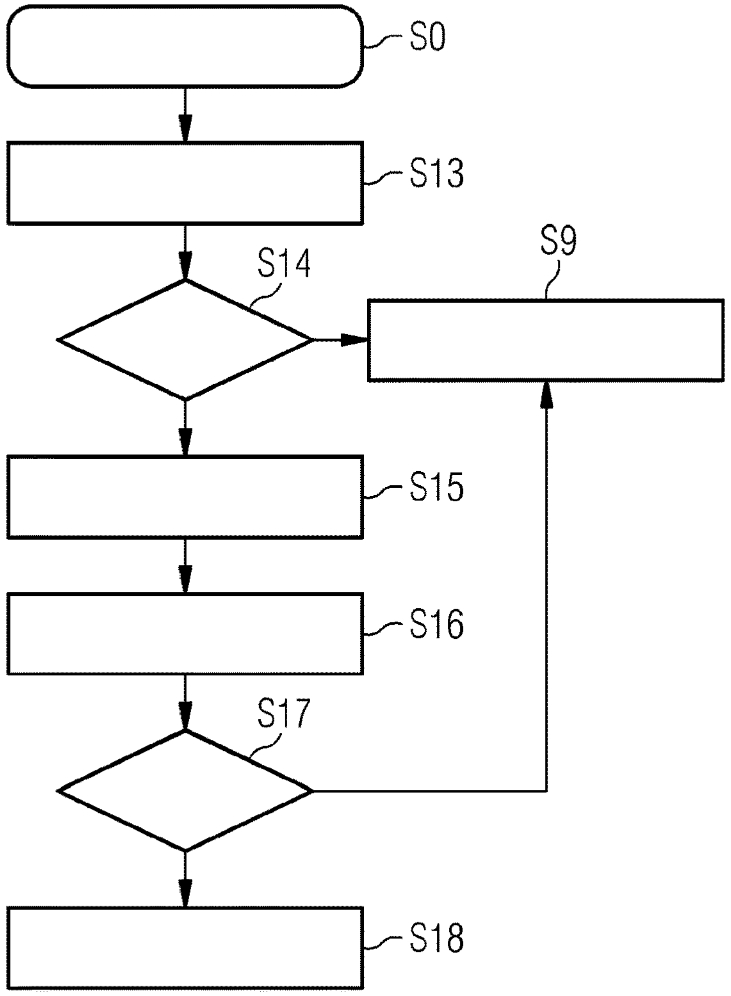
FIG. 7 shows a method for booting the computer element according to FIG. 6.

FIG. 7 shows a method for booting the computer element 1 according to FIG. 6. Here again, the method commences with act S0. In act S13, the authenticated decryption code 12 is hashed with the hash code 8. As a result of this, a third hash result is obtained.

In act S14, the third hash result is compared with the authenticated decryption code hash value from the eFuse 7*b*. In the event that the hash values compared in act S14 are not identical, an error is notified in act S9, and the process is terminated. In the event that the hash values compared in act S14 are identical, the protection unit 5 will be permitted access to the FPGA bitstream 6 and the authentication tag 6*c* contained therein (act S15 in FIG. 7).

In act S16, the protection unit 5 decrypts the FPGA bitstream 6 in accordance with the authenticated decryption code 12, by reference to the secret symmetric key in the eFuse 7*a*, and calculates a comparative authentication tag. In act S17, the protection unit 5 compares the authentication tag 6*c* with the comparative authentication tag (e.g., for the checking of the authentication tag). If the check executed in act S17 identifies a deviation, an error is notified in act S9, and the process is terminated. If the check executed in act S17 confirms that the authentication tag 6*c* is identical to the comparative authentication tag, the protection unit 5 configures the FPGA 11 with the decrypted FPGA bitstream 6 in act S18.

Figure 8:
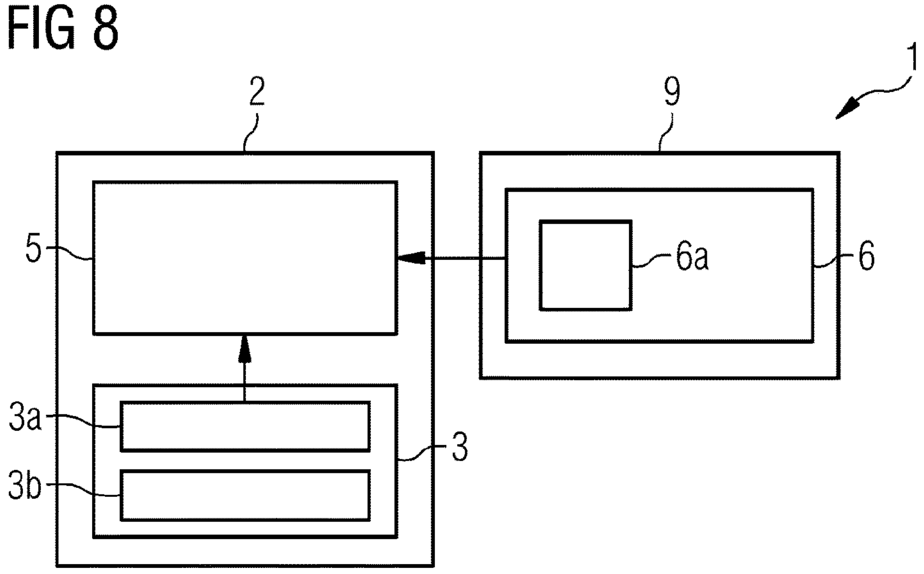
FIG. 8 shows a computer element having a booting device according to a fourth embodiment.

FIG. 8 shows a computer element 1 having a booting device 2, according to a fourth embodiment. Using the booting devices 2 according to the second embodiment and the third embodiment (FIGS. 4 and 6), it was possible for hash values and cryptographic keys, which form an element of the protection code 4, to be modified from outside the booting device 2, whereas the hash code 8 was present in a non-editable form.

Using the booting device 2 (e.g., processor) according to the fourth embodiment, it is also possible for a hash code or a corresponding cryptographic code to be modified (e.g., editable hash code, editable cryptographic code). To this end, the memory unit 3 includes a plurality of memory areas 3*a*, 3*b*, of which only two are represented in FIG. 8. In these memory areas 3*a*, 3*b*, the hash code 8, a cryptographic code, the signature verification code 10, the authenticated decryption code 12, or general root-of-trust functions may be defined and modified from outside the booting device 2.

The memory areas 3*a*, 3*b* may be one-time programable areas, and may be configured, for example, in the form of programable read-only memory (PROM). Alternatively, rewritable memory that, for example, is specifically access-protected for the control of write access may be employed. For example, the memory areas 3*a*, 3*b* will only permit modifications if the modification concerned is executed in accordance with a permissible modification process, for example: only via an interface that is provided for this purpose by the manufacturer of the booting device (e.g., via the Joint Test Action Group (JTAG), where the interface may be deactivated during the operation of the booting device, such as by an eFuse); only in accordance with a predefined standard, by reference to a predefined amendment file that is supplied by the manufacturer; only using a predefined configuration device that is supplied by the manufacturer (e.g., via the JTAG); and/or on a one-time basis. It is also possible that the programing of the memory unit 5 and the alteration of the protection code 4 will only be permissible if the computer element 1 is in a configuration mode and the eFuse 7*a*-7*c* has yet to be burned-in.

In the example according to FIG. 8, a signature verification code 10 and an associated public key are saved in the memory area 3*a*. Booting is executed by the processor 2 according to FIG. 8 in an analogous manner to the booting processes described with reference to FIGS. 4 to 7.

Although the present invention has been described with reference to exemplary embodiments, the invention is modifiable in a variety of ways. It is possible, for example, for individual aspects of the embodiments described with reference to the figures to be combined, according to the application concerned. The memory 9 described is an element of the booting device 2 (e.g., internal memory), but may also be arranged externally to the booting device 2 (e.g., external memory).

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A booting device for a computer element, for booting the computer element, wherein the booting device comprises:

a memory unit comprising an eFuse, the memory unit being configured to store a protection code outside of the eFuse; and a protection unit configured to check integrity of a software component of the computer element by reference to the protection code, the protection code being a program configured to be run by the protection unit, wherein the booting device is configured for executing the software component to boot the computer element, wherein the protection code is at least partially changeable from outside the booting device, on a one-time basis, via burn-in of a protection value of the protection code in the eFuse after the protection code is stored in the memory unit, outside of the eFuse, such that the protection code, after the burn-in in the eFuse, includes a first portion stored in the memory unit outside of the eFuse and a second portion stored in the eFuse, wherein the protection unit being configured to check the integrity of the software component of the computer element by reference to the protection code comprises the protection unit being configured, after the burn-in in the eFuse, to run the protection code including the first portion stored in the memory unit outside of the eFuse and the second portion stored in the eFuse, wherein the protection value comprises a comparative hash value, a cryptographic key, or the comparative hash value and the cryptographic key, wherein the booting device is configured to permit an alteration of the protection code from outside the booting device only in the event that:

the booting device detects that the alteration of the protection code is executed via an interface of the protection unit that is provided by a manufacturer of the booting device for this purpose;

the booting device detects that the alteration of the protection code is executed in accordance with a predefined standard, by reference to a predefined amendment file that is stipulated by the manufacturer of the booting device, or a combination thereof;

the booting device detects that the alteration of the protection code is executed using a predefined configuration device of the manufacturer;

the booting device only permits a one-time alteration of a respective region of the protection code, and the booting device detects that the alteration is a first alteration of the protection code in the respective region thereof, or any combination thereof, and wherein the protection unit being configured to check the integrity of the software component comprises the protection unit being configured to:

hash a signature verification code with a hash code of the booting device, such that a first hash result is obtained;

compare the first hash result with a signature verification code hash value of the memory unit;

in the event that the comparison of the first hash result with the signature verification code hash value confirms that the first hash result and the signature verification code hash value are identical:

acquire the software component, including a signature of the software component and a public key for the software component;

hash the public key of the software component with the hash code of the booting device, such that a second hash result is obtained;

compare the second hash result with a public key hash value of the memory unit;

in the event that the comparison of the second hash result with the public key hash value confirms that the second hash result and the public key hash value are identical, check the signature of the software component by reference to the signature verification code; and in the event that the check of the signature of the software component confirms that the signature is correct, execute the software component.

2. The booting device of claim 1, wherein the protection unit is configured, in conjunction with the integrity check of the software component for:

a comparison of a component hash value of the software component with the comparative hash value;

decryption, checking, or decryption and checking of cryptographically protected information assigned to the software component, by reference to the cryptographic key; or a combination thereof.

3. The booting device of claim 1, wherein the protection code comprises an editable cryptographic code, and wherein the protection unit is operable, in conjunction with the integrity check of the software component, to:

run the editable cryptographic code in order to execute a hash value comparison;

run the editable cryptographic code in order to execute a cryptographic encryption, decryption, check, or any combination thereof; or a combination thereof.

4. The booting device of claim 1, wherein the booting device is configured in the form of a computer chip.

5. The booting device of claim 1, wherein the computer element comprises a computer, an I/O module, a CPU module, or a FPGA system that, upon booting, is configurable in the form of a software component by reference to a bitstream.

6. The booting device of claim 1, wherein the software component comprises hardware, software, or hardware and software.

7. The booting device of claim 1, further comprising:

a booting unit configured to execute the software component in the event that the protection unit determines, by an integrity check, that the software component fulfils all requirements for integrity.

8. The booting device of claim 1, wherein the computer element is a FPGA system, and the protection unit being configured to check the integrity, decrypt the software component, or check the integrity and decrypt the software component comprises the protection unit being configured to:

hash an authenticated decryption code with a hash code of the booting device, such that a third hash result is obtained;

compare the third hash result with an authenticated decryption code hash value of the memory unit;

in the event that the comparison of the third hash result with the authenticated decryption code hash value confirms that the third hash result and the authenticated decryption code hash value are identical:

acquire the software component, which is configured in the form of a FPGA bitstream, including an authentication tag for the software component, by the booting device;

decrypt the FPGA bitstream by reference to the authenticated decryption code;

check the authentication tag of the software component; and in the event that the check of the authentication tag is successful, configure a FPGA of the FPGA system using the decrypted bitstream.

9. A computer element comprising:

a booting device for booting the computer element, the booting device comprising:

a memory unit comprising an eFuse, the memory unit being configured to store a protection code outside of the eFuse; and a protection unit configured to check integrity of a software component of the computer element by reference to the protection code, the protection code being a program configured to be run by the protection unit, wherein the booting device is configured for executing the software component to boot the computer element, wherein the protection code is at least partially changeable from outside the booting device, on a one-time basis, via burn-in of a protection value of the protection code in the eFuse after the protection code is stored in the memory unit, outside of the eFuse, such that the protection code, after the burn-in in the eFuse, includes a first portion stored in the memory unit outside of the eFuse and a second portion stored in the eFuse, wherein the protection unit being configured to check the integrity of the software component of the computer element by reference to the protection code comprises the protection unit being configured, after the burn-in in the eFuse, to run the protection code including the first portion stored in the memory unit outside of the eFuse and the second portion stored in the eFuse, wherein the protection value comprises a comparative hash value, a cryptographic key, or the comparative hash value and the cryptographic key, wherein the booting device is configured to permit an alteration of the protection code from outside the booting device only in the event that:

the booting device detects that the alteration of the protection code is executed via an interface of the protection unit that is provided by a manufacturer of the booting device for this purpose;

the booting device detects that the alteration of the protection code is executed in accordance with a predefined standard, by reference to a predefined amendment file that is stipulated by the manufacturer of the booting device, or a combination thereof;

the booting device detects that the alteration of the protection code is executed using a predefined configuration device of the manufacturer;

the booting device only permits a one-time alteration of a respective region of the protection code, and the booting device detects that the alteration is a first alteration of the protection code in the respective region thereof, or any combination thereof, and wherein the protection unit being configured to check the integrity of the software component comprises the protection unit being configured to:

hash a signature verification code with a hash code of the booting device, such that a first hash result is obtained;

compare the first hash result with a signature verification code hash value of the memory unit;

in the event that the comparison of the first hash result with the signature verification code hash value confirms that the first hash result and the signature verification code hash value are identical:

acquire the software component, including a signature of the software component and a public key for the software component;

hash the public key of the software component with the hash code of the booting device, such that a second hash result is obtained;

compare the second hash result with a public key hash value of the memory unit;

in the event that the comparison of the second hash result with the public key hash value confirms that the second hash result and the public key hash value are identical, check the signature of the software component by reference to the signature verification code; and in the event that the check of the signature of the software component confirms that the signature is correct, execute the software component.

10. A method for booting a computer element having a booting device the method comprising:

saving, by a memory unit comprising an eFuse, a protection code outside of the eFuse;

executing an integrity check on a software component of the computer element that is run upon the booting of the computer element, by reference to the protection code, the protection code being a program configured to be run by the protection unit; and at least partially altering the protection code from outside the booting device, on a one-time basis, the at least partially altering the protection code from outside the booting device comprising burning-in of a protection value of the protection code in the eFuse after the saving of the protection code in the memory unit, outside of the eFuse, such that the protection code, after the burn-in in the eFuse, includes a first portion stored in the memory unit outside of the eFuse and a second portion stored in the eFuse, wherein executing the integrity check on the software component of the computer element by reference to the protection code comprises, after the burning-in of the protection value in the eFuse, running the protection code including the first portion stored in the memory unit outside of the eFuse and the second portion stored in the eFuse, wherein the protection value comprises a comparative hash value, a cryptographic key, or the comparative hash value and the cryptographic key, wherein the booting device is configured to permit the at least partially altering the protection code from outside the booting device only in the event that:

the booting device detects that the alteration of the protection code is executed via an interface of the protection unit that is provided by a manufacturer of the booting device for this purpose;

the booting device detects that the alteration of the protection code is executed in accordance with a predefined standard, by reference to a predefined amendment file that is stipulated by the manufacturer of the booting device, or a combination thereof;

the booting device detects that the alteration of the protection code is executed using a predefined configuration device of the manufacturer;

the booting device only permits a one-time alteration of a respective region of the protection code, and the booting device detects that the alteration is a first alteration of the protection code in the respective region thereof, or any combination thereof, and wherein executing the integrity check on the software component of the computer element comprises:

hashing a signature verification code with a hash code of the booting device, such that a first hash result is obtained;

comparing the first hash result with a signature verification code hash value of the memory unit;

in the event that the comparing of the first hash result with the signature verification code hash value confirms that the first hash result and the signature verification code hash value are identical:

acquiring the software component, including a signature of the software component and a public key for the software component;

hashing the public key of the software component with the hash code of the booting device, such that a second hash result is obtained;

comparing the second hash result with a public key hash value of the memory unit;

in the event that the comparing of the second hash result with the public key hash value confirms that the second hash result and the public key hash value are identical, checking the signature of the software component by reference to the signature verification code; and in the event that the checking of the signature of the software component confirms that the signature is correct, executing the software component.

11. The booting device of claim 3, wherein the editable cryptographic code is an editable hash code.

12. The booting device of claim 6, wherein the software component is a first bootloader stage.

13. In a non-transitory computer-readable storage medium that stores instructions executable by one or more processors for booting a computer element, the instructions comprising:

saving, by a memory unit of a booting device, a protection code;

executing, by a protection unit of the booting device, an integrity check on a software component of the computer element that is run upon the booting of the computer element, by reference to the protection code, the executing of the integrity check comprising:

hashing a signature verification code with a hash code of the booting device, such that a first hash result is obtained;

comparing the first hash result with a signature verification code hash value of the memory unit; and in the event that the comparing of the first hash result with the signature verification code hash value confirms that the first hash result and the signature verification code hash value are identical:

acquiring the software component, including a signature of the software component and a public key for the software component;

hashing the public key of the software component with the hash code of the booting device, such that a second hash result is obtained;

comparing the second hash result with a public key hash value of the memory unit;

in the event that the comparing of the second hash result with the public key hash value confirms that the second hash result and the public key hash value are identical, checking the signature of the software component by reference to the signature verification code; and in the event that the checking of the signature of the software component confirms that the signature is correct, executing the software component; and at least partially altering the protection code from outside the booting device.

14. The booting device of claim 1, wherein the booting device is configured to permit the alteration of the protection code from outside the booting device only in the event that:

the booting device detects that the alteration of the protection code is executed via an interface of the protection unit that is provided by a manufacturer of the booting device for this purpose;

the booting device detects that the alteration of the protection code is executed in accordance with a predefined standard, by reference to a predefined amendment file that is stipulated by the manufacturer of the booting device, or a combination thereof;

the booting device detects that the alteration of the protection code is executed using a predefined configuration device of the manufacturer; or any combination thereof.

15. The booting device of claim 14, wherein the booting device is configured to permit the alteration of the protection code from outside the booting device only in the event that:

the booting device detects that the alteration of the protection code is executed via an interface of the protection unit that is provided by a manufacturer of the booting device for this purpose; or the booting device detects that the alteration of the protection code is executed using a predefined configuration device of the manufacturer.

* * * * *